US012641318B2

(12) United States Patent
Hatambeiki et al.

(10) Patent No.: US 12,641,318 B2
(45) Date of Patent: May 26, 2026

(54) SYSTEM AND METHOD FOR USING A VIRTUAL AGENT TO PROVIDE CONSUMER ELECTRONIC DEVICE RELATED TECHNICAL SUPPORT

(71) Applicant: Universal Electronics Inc., Scottsdale, AZ (US)

(72) Inventors: Arsham Hatambeiki, San Francisco, CA (US); Nicu Ahmadi, San Francisco, CA (US); Jelmer Jonkman, Almelo (NL)

(73) Assignee: Universal Electronics Inc., Scottsdale, AZ (US)

( * ) Notice: Subject to any disclaimer, the term of this patent is extended or adjusted under 35 U.S.C. 154(b) by 961 days.

(21) Appl. No.: 17/336,853

(22) Filed: Jun. 2, 2021

(65) Prior Publication Data

US 2022/0394348 A1 Dec. 8, 2022

(51) Int. Cl.

| | |
|---|---|
| *H04N 7/16* | (2011.01) |
| *G06F 3/0488* | (2022.01) |
| *G06F 40/174* | (2020.01) |
| *G06V 40/20* | (2022.01) |
| *G10L 15/22* | (2006.01) |
| *G10L 25/63* | (2013.01) |
| *H04N 21/422* | (2011.01) |

(Continued)

(52) U.S. Cl.
CPC ......... *H04N 21/485* (2013.01); *G06F 3/0488* (2013.01); *G06F 40/174* (2020.01); *G06V 40/20* (2022.01); *G10L 15/22* (2013.01); *G10L 25/63* (2013.01); *H04N 21/42203* (2013.01); *H04N 21/44218* (2013.01); *H04N 21/4524* (2013.01)

(58) Field of Classification Search
CPC ........... H04N 21/485; H04N 21/42203; H04N 21/44218; H04N 21/4524; G06F 3/0488; G06F 40/174; G06F 40/35; G06V 40/20; G06V 40/174; G06V 40/28; G10L 15/22; G10L 25/63
USPC ......................................................... 725/10
See application file for complete search history.

(56) References Cited

U.S. PATENT DOCUMENTS

| 8,850,315 B1 * | 9/2014 | Rogers ................... G06F 9/453 |
|---|---|---|
| | | 715/767 |
| 10,157,359 B2 * | 12/2018 | Chirayil ............... G06F 40/289 |

(Continued)

FOREIGN PATENT DOCUMENTS

| WO | 2019008572 A1 | 1/2019 |
|---|---|---|
| WO | 2020/065081 A1 | 4/2020 |

OTHER PUBLICATIONS

ISA/US, Int. Search Report and Written Opinion issued on PCT application No. PCT/US22/31711, dated Sep. 9, 2022, 16 pages.

(Continued)

*Primary Examiner* — Sahar Aqil Riaz
(74) *Attorney, Agent, or Firm* — .Greenberg Traurig, LLP

(57) ABSTRACT

Contextual information for an ecosystem that includes a consumer electronic device is used by a virtual agent to speed up the process by which the virtual agent provides technical support related to the consumer electronic device. The contextual information is used to reduce the amount of information the virtual agent requires from the consumer. Whilst collecting information from the consumer, the virtual agent also functions to determines if a hand-off of the consumer to a further agent is needed.

26 Claims, 9 Drawing Sheets

(51) Int. Cl.
  H04N 21/442     (2011.01)
  H04N 21/45      (2011.01)
  H04N 21/485     (2011.01)

(56)           References Cited

U.S. PATENT DOCUMENTS

| | | | | |
|---|---|---|---|---|
| 10,645,439 | B2 * | 5/2020 | Card, II | H04N 21/4884 |
| 11,122,342 | B2 * | 9/2021 | Puniyani | H04N 21/4622 |
| 12,001,754 | B2 * | 6/2024 | De Assis | G06F 16/436 |
| 2011/0087511 | A1 * | 4/2011 | Werth | G06Q 10/06 |
| | | | | 705/7.14 |
| 2012/0108230 | A1 * | 5/2012 | Stepanian | H04N 21/4147 |
| | | | | 455/422.1 |
| 2012/0109384 | A1 | 5/2012 | Stepanian | |
| 2013/0107131 | A1 | 5/2013 | Barnett et al. | |
| 2013/0249679 | A1 | 9/2013 | Arling | |
| 2014/0122670 | A1 * | 5/2014 | Levy | H04L 41/0895 |
| | | | | 709/223 |
| 2016/0174035 | A1 * | 6/2016 | Hughes | H04W 4/023 |
| | | | | 455/456.3 |
| 2016/0266654 | A1 * | 9/2016 | Lehtiniemi | G06F 3/0484 |
| 2016/0309224 | A1 * | 10/2016 | Legallais | H04N 21/458 |
| 2018/0052664 | A1 * | 2/2018 | Zhang | G06N 5/04 |
| 2018/0109845 | A9 * | 4/2018 | Miyazaki | H04N 21/44218 |
| 2018/0260092 | A1 * | 9/2018 | Alsante | G06F 3/041 |
| 2018/0357306 | A1 * | 12/2018 | Osotio | G06F 16/3329 |
| 2018/0365212 | A1 * | 12/2018 | Banerjee | H04L 51/02 |
| 2020/0013117 | A1 * | 1/2020 | Mathwig | G06Q 40/02 |
| 2020/0259887 | A1 | 8/2020 | Hatambeiki | |
| 2020/0356237 | A1 * | 11/2020 | Moran | G06F 3/0481 |
| 2021/0338177 | A1 * | 11/2021 | Cavalli | A61B 5/744 |
| 2022/0014798 | A1 * | 1/2022 | Fang | H04N 21/4425 |
| 2022/0232290 | A1 * | 7/2022 | Ham | H04N 21/4394 |

OTHER PUBLICATIONS

Extended European Search Report from application No. 2286752.4, dated Mar. 12, 2024, 10 pp.

* cited by examiner

SYSTEM AND METHOD FOR USING A VIRTUAL AGENT TO PROVIDE CONSUMER ELECTRONIC DEVICE RELATED TECHNICAL SUPPORT

BACKGROUND

Systems and methods for obtaining information about appliances that are included within a given environment or ecosystem, such as the home, are known in the art. As described in US 2013/0107131 and US 2013/0249679 (which publications are incorporated herein by reference in their entirety), such information is most often obtained to configure or "set-up" a controlling device. In this regard, a controlling device is typically configured by being provisioned with an appropriate set of command data, from within a library of command data sets, for each of the specific appliances to be controlled. The appliance identifying information in such a system is typically information that serves to identify each appliance by its make, and/or model, and/or type, and/or capabilities.

SUMMARY

Described hereinafter are systems and/or methods that use appliance identifying data (and possibly other environmental data, such as appliance state related data, network related data, and the like) to provide technical support services to a consumer.

In an example, such technical support services are provided to a consumer via use of a system and method that supports a virtual agent. The example virtual agent is intended to guide the consumer through the onboarding, setup, and/or troubleshooting of a consumer electronic device, a third-party service to be used with a consumer electronic device, or a combination of the two. The example virtual agent is also intended to provide a mechanism for the consumer to discover new or unknown features of these devices, services, and the interoperability between the devices and services. For this purpose, the example virtual agent will be able to tap into a multitude of internal and/or external knowledge/data sources in order to detect, preferably proactively, an issue associated with a consumer electronic device, service, and/or environment which includes the same, find the root cause for the issue, and guide the consumer to a solution that addresses the located issue. The example virtual agent may also be used to find a potential indicator that predicts an upcoming issue for the consumer.

In some instances, when the virtual agent is not itself able to trouble shoot an issue, the virtual agent may be used to provide a hand-off to a third-party virtual agent or to a human agent to seek their support in finding a solution to the issue that the consumer is experiencing. As a part of this hand-off, the virtual agent will preferably provide to the subsequent agent the context of the initial interaction with the consumer. If a warm hand-off is not possible, the virtual agent can provide the consumer with the contact details of a third-party agent, e.g., the consumer service phone number of the original device manufacturer.

In some instances, the contextual information gathered by the virtual agent can simply be a transcript and/or a recording (in whole or in part) of the conversation with the consumer. In some instances, the transcript and/or recording may be augmented with additional information as needed, for example, when the system determines that certain system components, states, interconnectivities, etc. went unspoken during the consumer's interaction with the virtual agent. In preferred instances, contextual information includes at least information about the devices that the consumer has in his/her house, the current and/or historic status of these devices, the services that run on these devices, the firmware version of these devices, when the device has been seen online for the last time, etc. All or part of this information can be captured by the virtual agent device or be accessed from a data repository wherein it would be stored in association with a consumer, household, and/or the like identifier. The information stored in the database can be obtained by the system in connection with other processes, such as a device warranty registration, a controlling device setup process, service enrollment information, etc.

A better understanding of the objects, advantages, features, properties and relationships of the hereinafter described systems/methods will be obtained from the following detailed description and accompanying drawings which set forth illustrative embodiments and which are indicative of the various ways in which the principles of the described systems/methods may be employed.

BRIEF DESCRIPTION OF THE DRAWINGS

For a better understanding of the various aspects of the described systems and methods, reference may be had to preferred embodiments shown in the attached drawings in which.

DETAILED DESCRIPTION

To address the problems a consumer faces owing to the rising complexity of the devices and services that consumers are using to create smart homes, the following describes systems and methods for providing technical support and/or recommendation services to a consumer. The described systems and methods will provide a consumer with access to a virtual agent which, among other things, is intended to provide a consumer with step by step help to troubleshoot an explicitly described or system discerned issue and, if needed, to further provide the consumer with access to a third party that the consumer can interact with if needed, a so-called hand-off.

Figure 1:
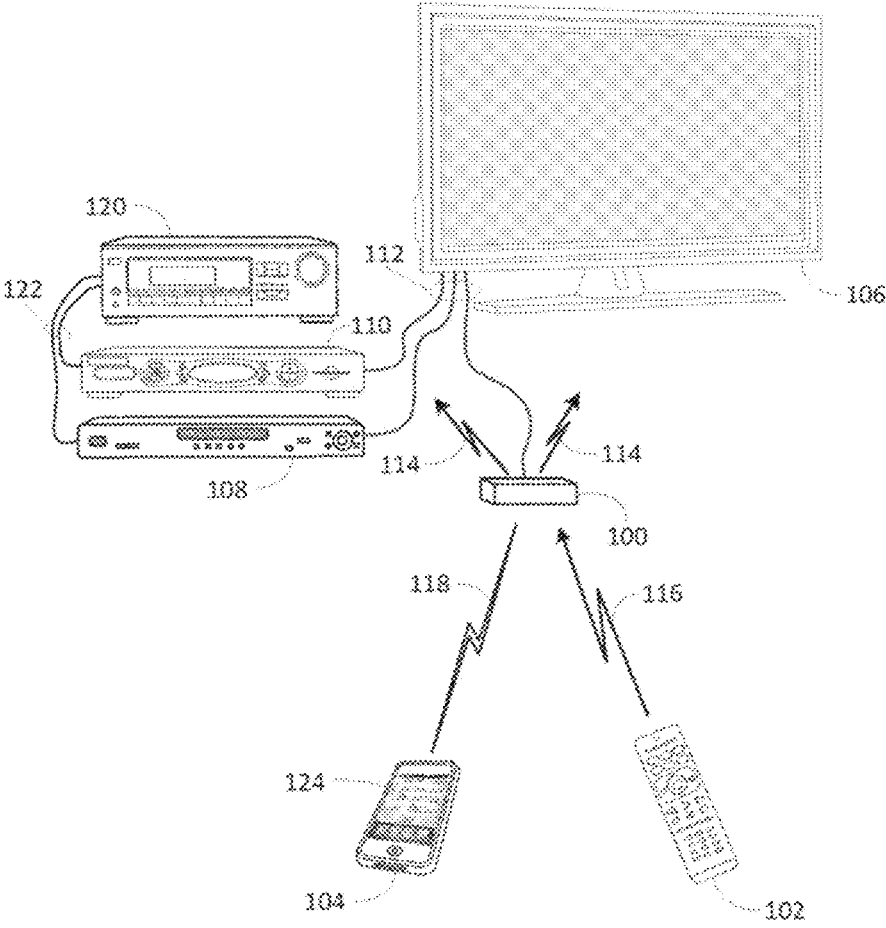
FIGS. 1 and 2 illustrate example systems in which a standalone controlling device may be utilized to command operation of several appliances.

With reference to FIG. 1, there is illustrated an example system in which a controlling device 100 may be used to issue commands to control various controllable appliances, such as a television 106, a cable set top box combined with a digital video recorder ("STB/DVR") 110, a DVD player 108, and an AV receiver 120. While illustrated in the context of a television 106, STB/DVR 110, a DVD player 108, and an AV receiver 120, it is to be understood that controllable appliances may include, but need not be limited to, televisions, VCRs, DVRs, DVD players, cable or satellite converter set-top boxes ("STBs"), amplifiers, CD players, game consoles, home lighting, drapery, fans, HVAC systems, thermostats, personal computers, etc.

In the illustrative example of FIG. 1, appliance commands may be issued by device 100 in response to infrared ("IR") request signals 116 received from a remote control device 102, radio frequency ("RF") request signals 118 received from smart device 104 having a resident remote control app 124, or any other device from which device 100 may be adapted to receive requests, using any appropriate communication method. In some instance, the device 100 further supports an intelligent voice assistant, such as described in U.S. Ser. No. 16/816,483, whereby the device 100 will be capable of issuing commands to the appliances in response to voice commands uttered by a consumer—whether received directly from the consumer or indirectly from an intermediate device.

As illustrated, transmission of the requested appliance commands from the device to appliances 106, 108, 112, 120 may take the form of wireless IR signals 114 or CEC commands issued over a wired HDMI interface 112, as appropriate to the capabilities of the particular appliance to which each command may be directed. In the example system illustrated in FIG. 1, AV receiver 120 may not support HDMI inputs, being connected to audio source appliances 108,110 via S/PDIF interfaces 122. Accordingly, device 100 may be constrained to transmit all commands destined for AV receiver 120 exclusively as IR or RF signals, while commands destined for the other appliances 106 through 110 may take the form of either CEC or IR signals as appropriate for each command. It is also to be understood that certain TV manufacturers may elect not to support volume adjustment via CEC. If the illustrative TV 106 is of such manufacture, device 100 may relay volume adjustment requests to TV 106 as IR signals 114, while other requests such as power on/off or input selections may be relayed in the form of CEC commands over HDMI connection 112. Thus, it will be understood that the described system will be aware of, and may adapt itself to operate in a manner that depends in whole or in part upon, the appliances within the environment, the capabilities of those appliances, the manner in which the appliances are connected, etc.

It is also to be appreciated that, while illustrated in the context of IR, RF, and wired CEC signal transmissions, in general, transmissions to and from device 100 may take the form of any convenient IR, RF, hardwired, point-to-point, or networked protocol, as necessary for a particular embodiment. Further, while wireless communications 116, 118, etc., between exemplary devices are illustrated herein as direct links, it should be appreciated that in some instances such communication may take place via a local area network or personal area network, and as such may involve various intermediary devices such as routers, bridges, access points, etc. Since these items are not necessary for an understanding of the instant disclosure, they are omitted from this and subsequent Figures for the sake of clarity.

Since remote control apps installable on smart devices, such as that contemplated in the illustrative device 104 are well known, for the sake of brevity the operation, features, and functions thereof will not be described in detail herein. Nevertheless, if a more complete understanding of the nature of such apps is desired, the interested reader may turn to, for example, U.S. patent application Ser. No. 12/406,601 or U.S. patent application Ser. No. 13/329,940, (now U.S. Pat. No. 8,243,207).

Figure 2:
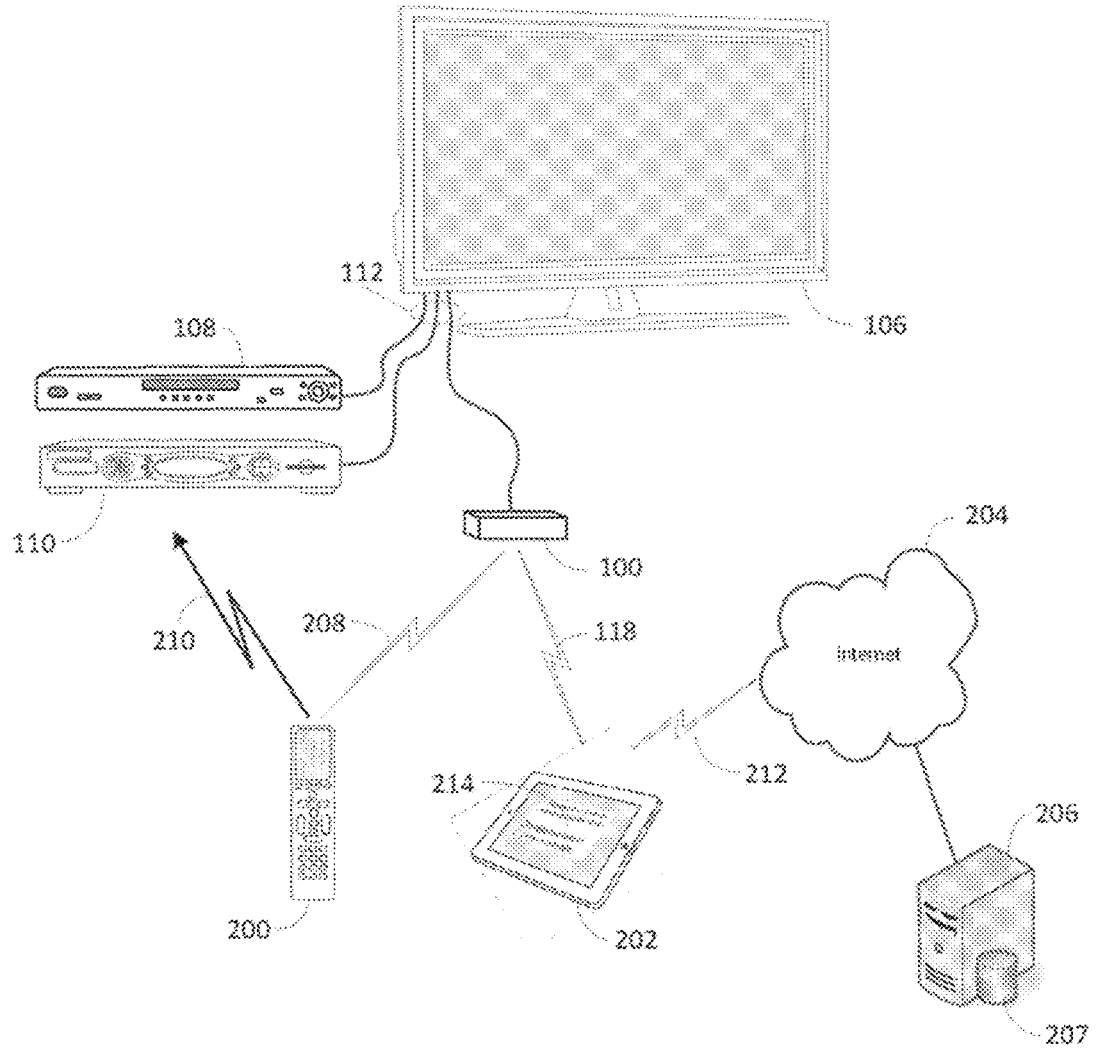

Turning now to FIG. 2, in a further illustrative embodiment, device 100 may receive wireless request signals from a remote control 200 and/or an app resident on a tablet computer 202. As before, command transmissions to appliances 106, 108, 110 may take the form of wired CEC commands or wireless IR and/or RF commands. However, in this example remote control 200 may be in bi-directional communication 208 with device 100 and accordingly the device 100 may delegate the transmission of IR commands 210 to the device 200, i.e., use remote control 200 as a relay device for those commands determined to be best executed via IR and/or RF transmissions. As also generally illustrated in FIG. 2, a setup app 214 executing on a smart device such as tablet computer 202 may be utilized in conjunction with an Internet (212, 204) accessible or cloud based server 206 and associated database 207 to initially configure device 100 for operation with the specific group of appliances to be controlled, i.e., to communicate to device 100 a matching command code set and capability profile for each particular appliance to be controlled, for example based on type, manufacture, model number, etc.

Figure 3:
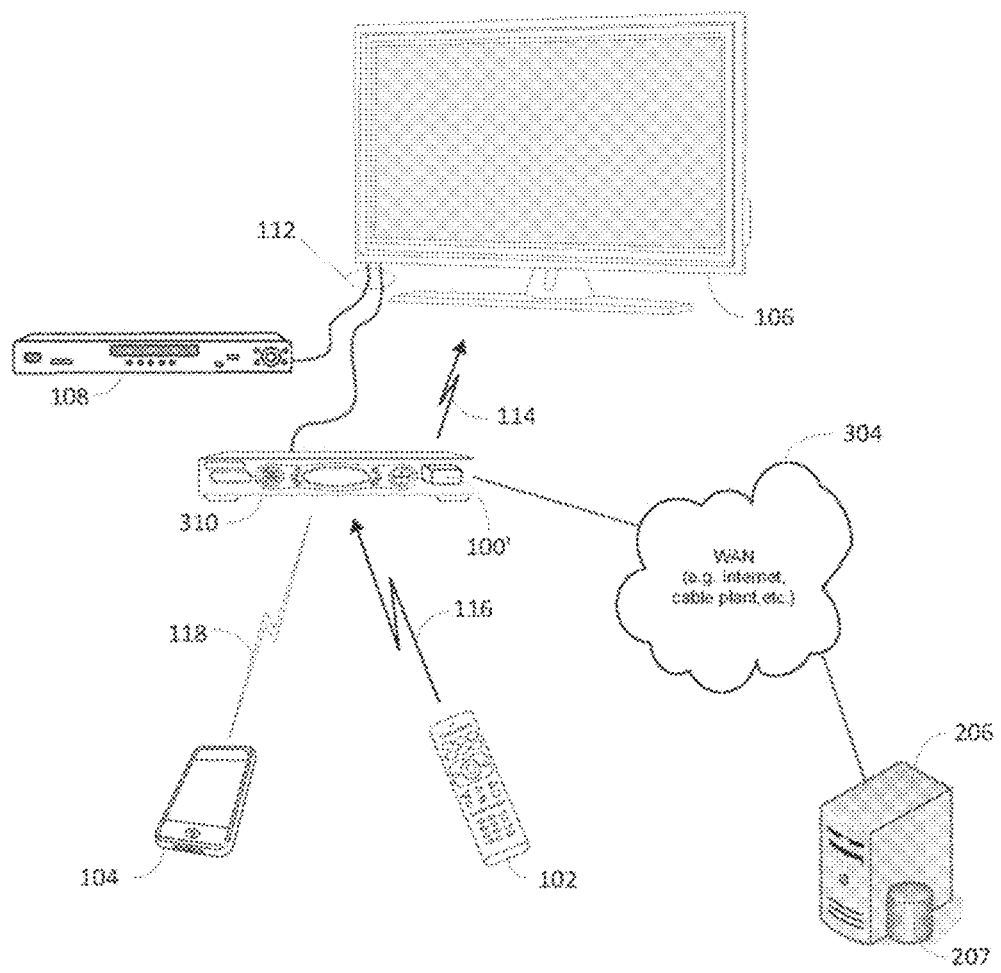
FIGS. 3 and 4 illustrate example systems in which controlling device functionality may be incorporated into an appliance which is part of a home entertainment system.

With reference to FIG. 3, in a further illustrative embodiment the aforementioned remote control functionality may be provided by one or more modules 100' embedded in a consumer electronic device, for example STB/DVR 310. When modules 100' are embedded in a consumer electronic device, the device is considered to be functionally equivalent to the above described controlling device 100. As such, when a controlling device is referenced, the accompany description will be understood to be equally applicable to an appliance having the embedded modules 100'.

In the example illustrated in FIG. 3 remote control 102 and/or smart device 104 may transmit wireless request signals directly to STB/DVR 310 for action by the built-in functional module(s) 100', which actions may, as before, comprise CEC command transmissions via HDMI connection 112 or IR command transmissions 114, originating in this instance from an IR blaster provisioned to the STB/DVR appliance 310. Additionally, the module 100' may itself include virtual voice assistance capabilities and/or may cooperate with a virtual voice assistant otherwise included within the appliance and/or the system more generally to allow for the issuance of commands in response to voice prompts being received from a consumer. In this configuration, a set up application resident in STB/DVR 310 may be utilized to configure functional module(s) 100', using for example an Internet connection 304 accessible through a cable modem and/or cable distribution system headend. As described hereinafter, such a virtual voice assistant may also be utilized to provide technical support to a consumer.

Figure 4:
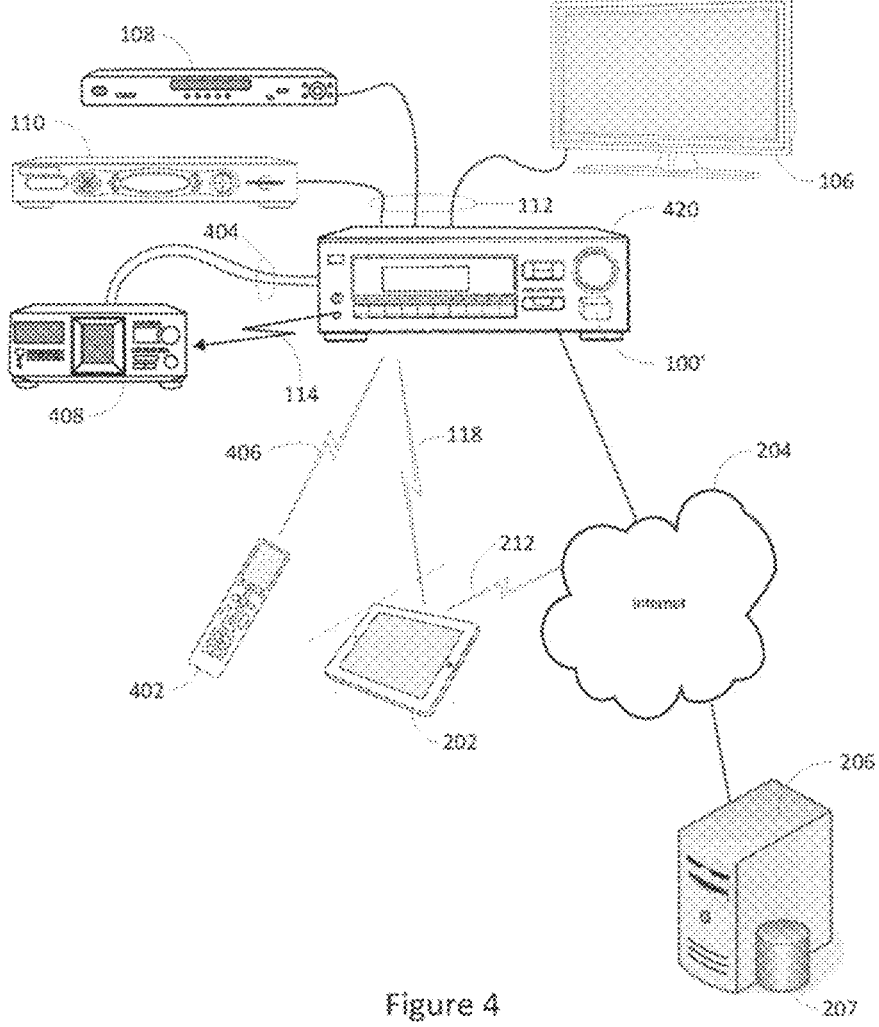

In the further illustrative embodiment of FIG. 4, the functional module(s) 100' may be embedded in an AV receiver 420 which may serve as an HDMI switch between various content sources such as a STB/DVR 110 or a DVD player 108 and a rendering device such as TV 106. In addition to HDMI inputs, AV receiver 420 may also support various other input and output formats via use of appropriate ports, for example analog inputs such as the illustrative 404 from CD player 408; composite or component video; S/PDIF coaxial or fiberoptic; etc. In this embodiment, request signals 406 may be directed to AV receiver 420, for example from remote control 402, for action by functional module(s) 100'. As before, resulting appliance commands may be transmitted using CEC signals transmitted over HDMI connections 112, or via IR signals 114 transmitted from an associated IR blaster. As appropriate for a particular embodiment, initial configuration of the functional module(s) 100' to match the equipment to be controlled may be performed by an Internet-connected app resident in AV receiver 420, or by an app resident in tablet computer 202 or other smart device, as mentioned previously in conjunction with FIG. 2.

As will be appreciated, various other configurations are also possible without departing from the underlying functional concept, for example the functional modules 100' may be incorporated into an Internet-capable TV, an HDMI switch, a game console, etc.; appliance command set and capability database 207 may be located at an interne cloud or a cable system headend, may be stored locally (in all or in part), which local storage may take the form of internal memory within the controlling device itself or in an appliance such as a TV, STB or AV receiver, or may take the form of a memory stick or the like attachable to a smart device or appliance; etc.

Figure 5:
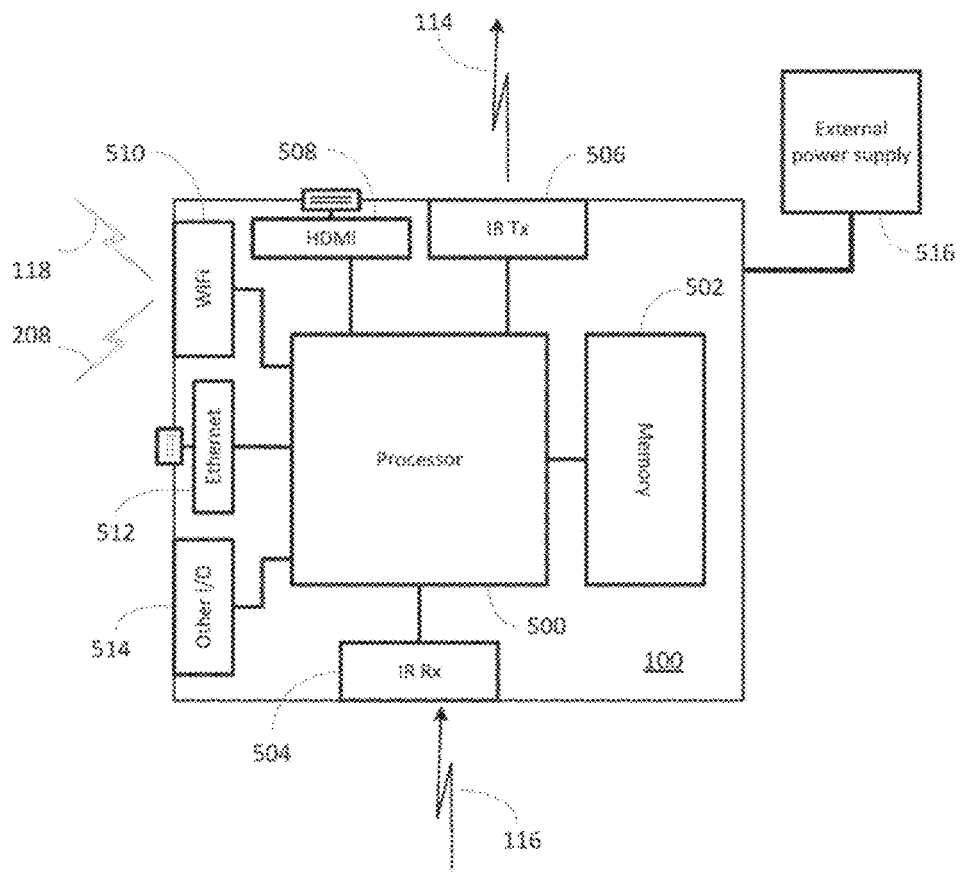
FIG. 5 illustrates a block diagram of an example controlling device.

With reference to FIG. 5, an example controlling device 100 (whether embodied as a standalone device or in an appliance supporting the functionality provided via use of embedded functional module(s) 100') includes, as needed for a particular application, a processor 500 coupled to a memory 502 which memory may comprise a combination of ROM memory, RAM memory, and/or non-volatile read/write memory which memories may take the form of a chip, a hard disk, a magnetic disk, an optical disk, a memory stick, etc., or any combination thereof. It will also be appreciated that some or all of the illustrated memory may be physically incorporated within the same IC chip as the processor 500 (a so called "microcontroller") and, as such, it is shown separately in FIG. 5 only for the sake of clarity. Interface hardware provisioned as part of the example platform may include IR receiver circuitry 504 and IR transmitter circuitry 506; an HDMI interface 508; a WiFi transceiver and interface 510; an Ethernet interface 512; and any other wired or wireless I/O interface(s) 514 as appropriate for a particular embodiment, by way of example without limitation Bluetooth, RF4CE, USB, Zigbee, Zensys, X10/Insteon, Home-Plug, HomePNA, etc. The device 100 may additionally include a microphone for receiving audio commands from a consumer. The electronic components comprising the example device 100 (which herein also is being used to reference an appliance having functional module(s) 100') may be powered by an external power source 516. In the case of a standalone device 100, this may comprise for example a compact AC adapter "wall wart," while a controlling device that is in the form of integrated functional module(s) 100' may draw operating power from the appliance into which they are integrated. It will also be appreciated that in the latter case, in certain embodiments processor 500 and/or memory 502 and/or certain portions of interface hardware items 504 through 514 may be shared with other functionalities of the host appliance.

It will also be understood by those skilled in the art, some or all of the memory 502 may include executable instructions that are intended to be executed by the processor 500 to control the operation of the host device as well as data which serves to define the necessary control protocols and command values for use in transmitting command signals from the host device to controllable appliances (collectively, the command data). In this manner, the processor 500 may be programmed to control the various electronic components within the exemplary device 100 or device hosting the functional module(s) 100', e.g., to monitor the communication means 504, 510 for incoming request messages from controlling devices, to cause the transmission of appliance command signals, etc.

To cause the host device to perform an action, the host device may be adapted to be responsive to events, such as a received audible communication from a consumer, a command transmitted from the remote control 102 or smart device 104, changes in connected appliance status reported over the networked ecosystem, HDMI interface 508, WiFi interface 510, or Ethernet interface 512, etc. In response to an event, appropriate instructions within the functional programming of the host device may be executed. For example, when a command request is received from a smart phone 104, the functional programming may retrieve from the command data stored in memory 502 a preferred command transmission medium (e.g., IR, CEC over HDMI, IP over WiFi, etc.) and a corresponding command value and control protocol to be used in transmitting that command to an intended target appliance, e.g., TV 106, in a format recognizable by that appliance to thereby control one or more functional operations of that appliance. By way of further example, the status of connected appliances, e.g., powered or not powered, currently selected input, playing or paused, etc., as may be discerned from interfaces 508 through 514, may be monitored and/or tabulated by the functional programming in order to facilitate adjustment of appliance settings to match consumer-defined activity profiles, e.g. "Watch TV", "View a movie", etc.

Figure 6:
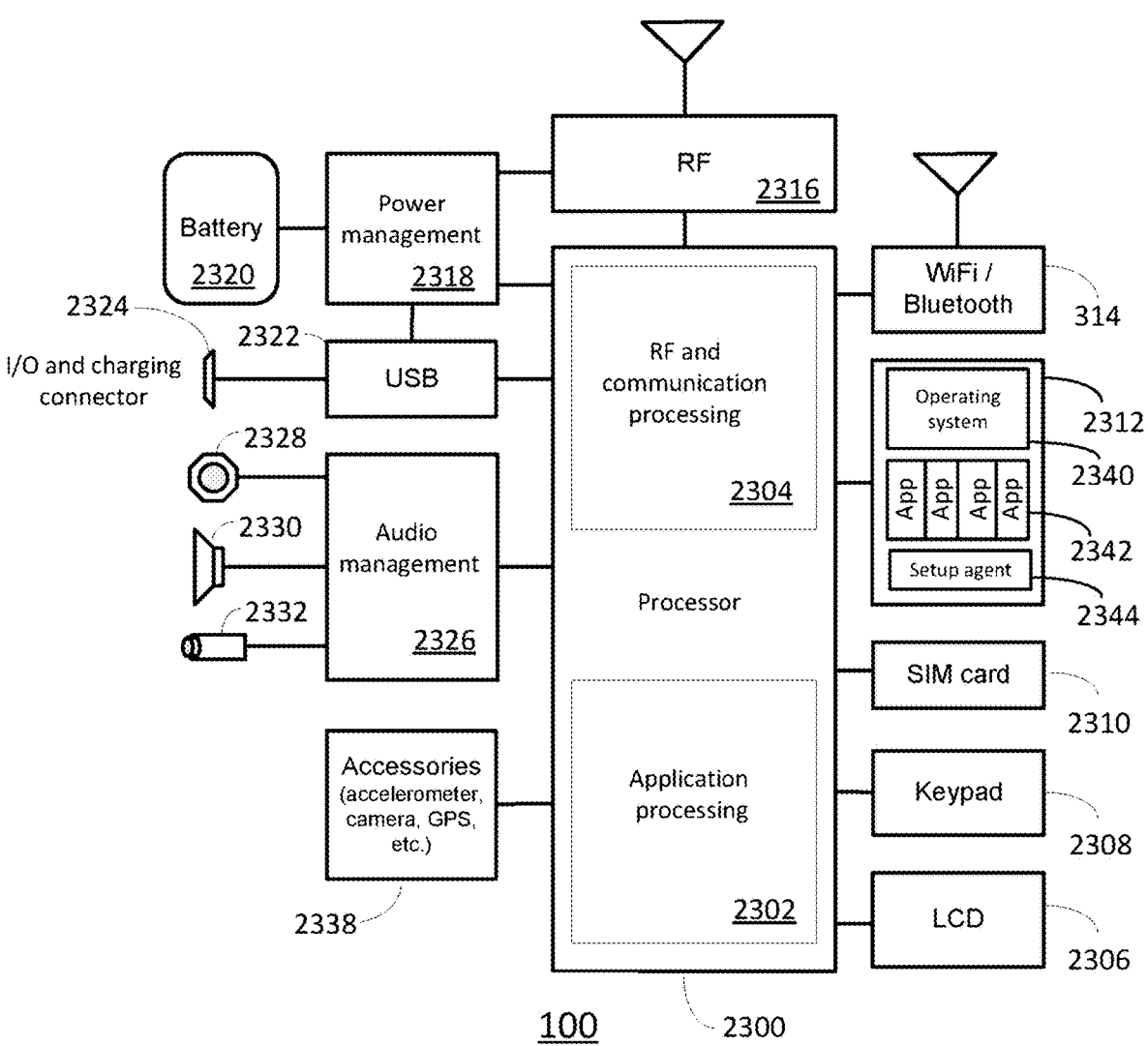
FIG. 6 illustrates a block diagram of a further example controlling device, particularly one suited for supporting a virtual voice assistant.

With reference to FIG. 6, a further example of a controlling device 100 (or appliance supporting the controlling device functionality 100') includes, as needed for a particular application, processing means 2300 which may comprise both an application processing section 2302 and an RF/communication processing section 2304; an LCD display 2306; a keypad 2308 which may comprise physical keys, touch keys overlaying LCD 2306, or a combination thereof; one or more microphones, a subscriber identification module (SIM) card 2310; memory means 2312 which may comprise ROM, RAM, Flash, or any combination thereof; wireless interface(s) 2314, supporting one or more of WiFi, Bluetooth, Zigbee, or the like RF wireless communications protocols, etc.; a wireless telephony interface 2316; power management circuitry 2318 with associated battery 2320; a "USB" interface 2322 and connector 2324; an audio management system 2326 with associated microphone 2328, speaker 2330 and headphone jack 2332; and various optional accessory features 2338 such as a digital camera, GPS, accelerometer, etc. Programming may be provided and stored in memory means 2312 to control the operation of the controlling device 2100 by way of operating system 2340 software such as for example iOS, Android, Linux, Web apps, etc., which operating software may support voice-enabled control as sell as the download and execution of various add-on apps 2342 as necessary for a particular purpose. A setup agent software 2344 may also be provisioned to controlling device 100 in order to facilitate detection, installation, and operation of manufacturer-supplied appliance interface apps. It is also to be understood that, while the illustrated smart device 100 is particularly adapted to receive input via use of a keypad and/or touchpad display that is provided as an integral part of the controlling device 100, the controlling device 100, can be provided input via use of further remote devices such as a remotely located mouse, pointer device, touch pad, voice assistant, or the like. These remotely located input devices would accordingly be adapted to communicate to an associated smart device data that is indicative of consumer interactions with such input devices to thereby achieve the same purposes described herein, e.g., to navigate and interact with a consumer interface.

Figure 7:
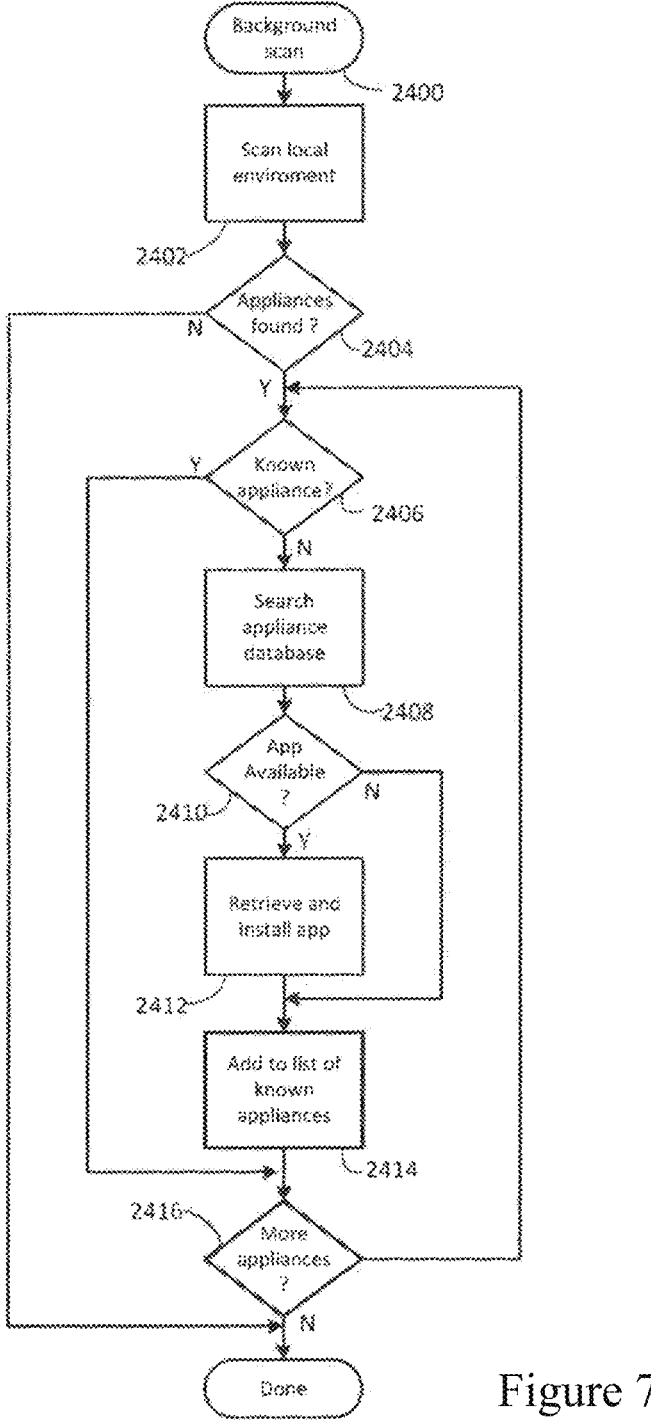
FIG. 7 illustrates an example method for installing an appliance related app.

With reference now to the flowchart of FIG. 7, at step 2400 the setup agent 2344 included with or otherwise associated with the controlling device functionality of the controlling device 100 may periodically initiate a scan 2402 of its current wired and/or wireless network environment (e.g., "WIFI," "BLUETOOTH,", etc. or any combination thereof) in order to ascertain the presence of one or more networked appliances. This action may be initiated automatically (for example based on a timer which is used to measure predetermined periods of time, in response to the device being turned on, in response to a detected change in location of the device using for example its GPS or the like type of functionality, etc.), or when connecting to new networks, or may be manually initiated by a consumer of device 100 (for example in response to an activation of a consumer input element, in response to the device 100 being moved, etc.) as appropriate for a particular embodiment. If it is determined at step 2404 that no responsive appliances are present in the environment, the setup agent actions are complete. If, however, responsive devices are detected on the wireless network, e.g., a device responds with data indicative of its identity in response to a polling request message sent from the device 100, then at step 2406 the setup agent may next determine, using the information received, if the responsive appliance is already known to the setup agent, e.g., determine if the appliance has already been detected during a previous detection operation or otherwise manually indicated to the device 100. Such a determination may be made, for example, by consulting a setup agent-administered listing of appliance identities. If the appliance is already known to the setup agent, processing continues at step 2416 to determine if further responsive appliances have been detected.

If it is determined that a newly responsive appliance has been detected, then at steps 2408 and 2410 the setup agent may next determine if an app is available for that appliance. Such a determination may be made, for example, by using vendor information, a third party compatibility database, or by a social network database which may contain related appliance information updated by other consumers or by searching a database that functions to cross-reference appliance identifying data as would be received from the appliances (e.g., data indicative of a manufacturer and model number) to available apps and locations from which such apps may be download. Such a database may be stored in local memory 2312 as part of the setup agent programming, may be located at a cloud-based data storage facility or server 2116, or a combination thereof, as appropriate for a particular embodiment. It will also be understood that such appliance identifying information may also be cross-referenced within the database to capability information for that appliance. Capability information may include information that would normally be included in an owner's manual and/or engineering specification for the appliance and such information may include, without limitation, schematic diagrams, hardware and software component identifications, supported protocol information, etc.

If no app is available, processing continues at step 2414, adding the instant appliance identity to the listing of known appliance identities. If it determined that an app is available, at step 2412 the appropriate app may be recommended to the consumer or may be downloaded to the device 100 from a location indicated in the database entry, e.g., a location pointed to by use of a URL, IP address, etc. As will be appreciated, depending on the particular implementation such a download and install may be performed automatically by the setup agent, or the agent may first present the download possibility to the consumer of device 100 for confirmation. As will also be appreciated, in those instances where the app download is sourced from a site which requires consumer sign-in and/or authentication, such as for example the "iTunes" brand store or "Android Marketplace" brand store, consumer credentials may be pre-loaded into the setup agent program to facilitate such automatic download or may be requested from smart device consumer each time download is to be performed. Such consumer credentials or consumer/home identifier may also be useful to cross-reference within a data repository discovered/consumer indicated devices and/or services within a smart home of a consumer.

When an app is downloaded and installed, in some embodiments the setup agent may register that app with a cloud based service, by way of forwarding unique identity information regarding the app and the environment (e.g., network and/or app owner information) in which it is operational to a server system such as for example the server. Such registration information may be subsequently utilized for the purpose of synchronizing multiple instances of the same app across different Operating Systems.

Next, at step 2414, the setup agent may add the current appliance identity or appliance fingerprint into a local tabulation of known appliances where the tabulation is preferably further, cross-referenced to a consumer and/or a smart home (possibly including sub-locations such as rooms therein). Such an identity may comprise a serial number, MAC address, or any other data value suitable to uniquely identify the appliance. Thereafter, at step 2416 the setup agent may ascertain if additional responsive appliances were detected and, if so the process described above is repeated, until all responding appliances have been accounted for.

Provision may also be made within the setup agent programming to allow a consumer to purge or edit entries in the tabulation of known appliances, for example when a smart device is permanently relocated to a different environment, etc. Removal of known appliance tabulation entries may also be performed automatically by the setup agent when a previously responsive appliance has failed to acknowledge several scan cycles; when an associated app is deleted by the consumer of the smart device; etc.

The setup agent may simply provide an already installed remote control app with the command code sets (or links to command code sets) needed to control one or more of the appliances within the ecosystem. Furthermore, in conjunction with the installation of certain apps which require specific equipment configurations, the setup may also generate macro command sequences as necessary to place various appliances into the required state upon initiation of the app and/or upon activation of a predetermined input element associated with the app. By way of illustration without limitation, a TV viewing or game show participation app may require that a TV to be set to a particular input and/or a cable set top box be tuned to a particular channel, etc., in which case a command sequence ("macro") may be created by the setup agent to be executed every time that app is initiated. As will be understood by those skilled in the art, a single GUI may display all of the app links and common macros across the system. Since methods for control of entertainment appliances and/or use of macros are well known in the art, these will not be discussed further herein, however for additional information the interested reader may turn to for example U.S. patent application Ser. No.

13/657,176 "System and Method for Optimized Appliance Control" or Ser. No. 13/071,661 "System and Method for Facilitating Appliance Control via a Smart Device", both of common ownership and both incorporated herein by reference in their entirety.

Once the system is configured, the system may monitor for appliance responses (or lack of appliance responses) to the transmission of commands (alone or included in a programmed macro command sequence) for the purpose of attempting to automatically (or via consumer instruction) rectify any programming, interconnectivity, interoperability, and/or device configuration problems that may exist within the system. For example, as described in US 2018/0098110, using keypress notification data/command transmission notification data, the operating software of an appliance, such as an AV receiver, may be adapted to monitor the AV inputs and outputs for the expected result of a consumer or system initiated command. If the expected result does not occur, a virtual voice assistant associated with the appliance/system may inform the consumer of the error, may prompt the consumer to retry the command, to check the operating mode of controlling device 100, etc. In this manner, if the currently selected activity is "Watch a Movie" and the operating software of AV receiver is notified by controlling device 100 that the "Play" key has been actuated, the operating software of the AV receiver may inspect the DVD player input to discern if a corresponding change in AV input data has occurred, for example an audio component has become present in a digital data stream where there was none before, and, if an error is detected, the operating software of the AV receiver may interact with the consumer to notify the consumer of the problem and to attempt to guide the consumer in the performance of corrective measures, generally considering the capability information for the devices. In circumstances where the appliance software is capable of automatically rectifying the discerned problem, for example having the ability to cause a command to be transmitted to change a state of the remote control, an appliance within the system, a network connection, etc., such action can be performed. Similarly, the operating software may monitor the reported consumer activity on controlling device 100 for patterns indicative of a probable issue, such as repeated actuation of the "Play" key 204 within a short space of time which would indicate to the system that an expected appliance response has not occurred. Yet further, the virtual voice assistant may listen for key words that are indicative of a problem, such as keywords found in a consumer statement "why won't the movie play?", and may use such key words, and the capability information retrieved for the system, to try and solve the problem, such as by guiding a consumer to change the input of the TV to the DVD player, etc.

As noted, a voice platform enabled device 100 can be used to discover an appliance and, after the appliance is discovered, a finger print for the appliance, e.g., manufacturer information, brand information, device type information, device model information, firmware version information, supported control interface information, information about a supported app running on the device, information about a supported app running on the device 100 for use with the device, and/or the like information usable to uniquely identify an appliance, may be used to retrieve one or more apps (which apps may include or provide access to appropriate command data, formatting information, etc. as needed) for providing voice control capabilities to the system. Furthermore, it is contemplated that, in some instances, an appliance discovery process can be utilized as described above for the purpose of determining if an appliance supports control via a voice enabled platform, e.g., to determine if the appliance is an "ALEXA" cloud-based, voice serving platform compatible device and, in the event the device 100 does not have the appropriate software for supporting that device already installed thereon, e.g., the "ALEXA" cloud-based, voice service platform software, the "SIRI" cloud-based, voice service platform supporting software, the "GOOGLE ASSISTANT" cloud-based, voice service platform software, the device 100 may be caused to first install such software in memory whereupon execution of that software may be used to perform further device discovery for use in obtaining one or more apps (also known as a "skill," "Action," or the like) for use in connection with the voice service platform supporting software to thereby configure the device 100 to communicate with that appliance. As before, any such located operating software and/or apps may be atomically installed on a device as a part of this process or may require manual installation (in which case, the consumer may be notified of the software and/or apps located and prompted for installation). Likewise, any discovery process may be performed automatically or upon manual instruction as described above.

In a similar manner, a voice platform enabled device 100 can be used to discover a service and, after the service is discovered, a fingerprint for the service, e.g., manufacturer information, brand information, information about an app running on the appliance, and/or the like information usable to uniquely identify a service, may be used to retrieve one or more apps (which apps may include or provide access to appropriate command data, formatting information, etc. as needed) for providing voice control capabilities to the system. Furthermore, it is contemplated that, in some instances, a service discovery process can be utilized as described above for the purpose of determining if an appliance supports a service that is controllable via a voice enabled platform, e.g., to determine if the appliance supports an "ALEXA" cloud-based voice serving platform compatible service and, in the event the device 100 does not have the appropriate software for supporting that service already installed thereon, e.g., the "ALEXA" cloud-based voice service platform software, the "SIRI" cloud-based voice service platform supporting software, the "GOGGLE ASSISTANT" cloud-based voice service platform software, the device 100 may be caused to first install such software in memory whereupon execution of that software may be used to perform further service discovery for use in obtaining one or more apps (also known as a "skill," "Action," or the like as noted above) for use in connection with the voice service platform supporting software to thereby configure the device 100 to communicate with that service and/or other appliances within the system. As before, any such located operating software and/or apps may be automatically installed on a device as a part of this process or may require manual installation (in which case, the consumer may be notified of the software and/or apps located and prompted for installation). Likewise, any discovery process may be performed automatically or upon manual instruction as described above.

It is further contemplated that the system may listen for and/or solicit the consumer to speak keywords for this same purpose. In this regard, the keywords might not only include the above noted information usable to form a fingerprint for an appliance and/or a service but might also include keywords that are known to be recognizable by a specific cloud-based, voice service platform. For example, upon the consumer speaking a wake work specific to a given type of digital assistant, e.g., "Alexa," "Hey Google," Hey Siri," Hey Xfinity" or the like, the system may cause the operating software associated with that digital assistant to be provided to the device 100 for installation (or may cause such operating software to be enabled if already resident of the device 100) and, if needed or desired, the operating software for the voice enabled platform, once operating on the device 100, can be used to perform further appliance and/or service detection processes for use in connection with configuring the device 100 with apps usable to communicate with such appliance and/or services as described above.

For use in identifying the appropriate operating software and/or apps that are to be provisioned to the device 100 as a part of these above-described processes, the database additionally cross-references fingerprint information to such operating software and/or apps. As noted previously, the database may be stored in memory of a local device and/or stored in memory associated with a server device that is accessible via a wide-area-network, e.g., stored in database associated with a cloud-computer service. In this manner, information needed to locate and download the appropriate operating software and/or apps can be deduced by a device and used to retrieve such software and/or apps from its own memory and/or memory associated with still further ser- vices, e.g., from a database associated with a third party server. It is also contemplated that any such software and/or app providing service can track owner information, e.g., log-in information, privileges, appliance(s) registered to the consumer, etc., to limit the ability to access and download apps, to seamlessly integrate downloaded and installed apps into the system, etc. For example, a cloud service provided for the noted purposes may function to authenticate a consumer when they log into the service and thereafter, using device and/or service discovery information received from one or more devices on the consumer's system, estab- lish an ownership mapping between the consumer and/or the consumer's smart home, the smart device, and appliances/ services that will be included in the consumer's "connected" environment. Again, such gathered information can be used in connection with attempting to trouble shoot any errors with the system that are raised by a consumer or otherwise automatically discerned.

As will be further understood by those of skill in the art, when using an app lookup API it is feasible for the voice assistant operating on the voice enabled platform of device 100 to notify and recommend to a consumer a skill, acces- sory, etc. for use with an appliance or service that was recently added to a network, e.g., a local area network, and/or to notify and recommend to a consumer a newly available skill, accessory, etc. for use with an appliance or service that was previously added to a network. The avail- ability of such skills or the like can be indicated to the consumer on the device 100, such as by having the device 100 display a special illumination pattern via use of LEDs, via an audible a notification, or the like. A consumer can then ask the voice assistant to check what the notification is about, which will lead to a recommendation whereupon the consumer can voice an acknowledgement to permit instal- lation of the skill, to purchase the accessory, etc. The purchase or an item (and installation of a skill if so pur- chased) can be performed via use of a cloud API call using input parameters such as the consumer identification, device 100 ID, skill ID, and the like as needed for any particular purpose. Alternatively, a consumer may also set a policy that any matched skills are allowed to be installed automatically in which case the smart device 100 will skip the skill recommendation and invoke the skill installation API when a new, matching skill is discovered without further consumer intervention.

As noted above, when the device 100 is associated with a virtual, voice assistant, the device 100 can function to determine if the consumer is having problems with the system, e.g., the virtual voice assistant hears the consumer use one or more words that are recognized by the system as being indicative of a problem or otherwise automatically notes a problem. In this regard, it is contemplated that the virtual voice assistant installed on one or more appliances within the home may function to act as a tech support module. The tech support module will use the appliance and/or app capability information for the one or more appliances and/or apps within the home, network and com- munications related information, etc, retrieved/discerned as a result of a performance of one or more of the aforemen- tioned discovery processes, to try and solve any problems the consumer may be experiencing, whether automatically or by guiding the consumer through the appropriate correc- tive steps.

Considering a case when a controlling device is being provisioned into a smart home system and the system learns that a compatibility problem exists between appliances within the ecosystem (whether by being learned from utter- ance(s) of the consumer or by being learned from an evaluation of system capabilities, communications, and appliance states), the app may determine to display a set of steps on the display device and/or speak to the consumer in an attempt to correct the problem (e.g., tell the consumer that the HDMI port in use does not support 4k). The instructions may ask the consumer for further information as needed and would provide to the consumer the steps for the consumer to manually correct the problem. In some circumstances, the voice enabled assistant may communicate commands to other apps and/or controllable devices within the system to automatically address the perceived problem.

In another example, the system may determine (from consumer comments, via a microphone, or otherwise) that speakers connected via HDMI to the TV are not producing sound and the cloud service may determine based on infor- mation obtained from the TV that ARC is not enabled on the TV. The UI generated by the app would then provide the consumer instructions on how to activate the ARC operation on the TV if the app does not itself have capability to issue the commands (in this case, a series of menu navigation commands) that would be needed to automatically perform this operation. Additionally, an image of an auto port selec- tion hub with ARC support may be suggested to the con- sumer for purchasing in keeping with the below.

In instances when a problem is not correctable by modi- fying a state of one or more appliances, the network, and/or the like, the system may recommend that the consumer obtain other product for addition into the system. For example, an accessory such as an HDMI hub may be displayed as an image (a photo) that allows the consumer to select and purchase the accessory to address a learned interconnectivity problem. In some cases, the system may also recommend product to simply provide a more robust smart home system, e.g., to allow the system to use capa- bilities that are being underutilized. The identify data of each discovered device is thus used by a cloud service and is analyzed to determine what data to send to the agent for the agent to provide error correction instructions and recom- mendations as needed.

In a preferred embodiment, the virtual voice assisted agent would always run in the background and would proactively launch a consumer interface when a problem is encountered, e.g., the systems learns of an appliance that is not responding to issued commands as expected/desired, the system hears a consumer utter one or more key words, etc. The agent would then proactively suggest a cure to the perceived problem. For example, to provide a better viewing experience for the consumer, such as when the consumer is watching a movie and the agent/server determines that there are smart lights on in the same room, the agent may suggest to the consumer that the lights can be automatically dimmed while the movie is being watched and may then respond to a request received from the consumer to dim the lights by sending the appropriate command(s) to a control module associated with such lights, etc.

The agent may be a separate app embedded in the device containing the controlling device functionality 100' and the app may be automatically downloaded to an appliance as part of the provisioning operation described above The app may also be installed on a cell phone and perform the analysis of the detected devices partially or wholly on the phone or via use of a cloud service.

By way of further example, considering a consumer electronic device that has capabilities associated with HDMI version 2.0 and an appliance having at least one port that supports HDMI version 2.0 capabilities (which means the appliance supports 4K video and another HDMI port that supports a lower version of HDMI capabilities, i.e., a port that does not support 4K video), the functional programming may use the consumer electronic device identifying information to determine that the consumer electronic device is 4K video capable. Next, having determined that the consumer electronic device is 4K capable, the method would check to determine if the consumer electronic device is connected to a 4K capable port of the appliance, e.g., does the current state indicate that the appliance is connected to one of HDMI port 1 or HDMI port 2 of the appliance. To this end, the voice enabled assistant may instruct the consumer to place the consumer electronic device into a known state and may then cause a scan of the ports of the appliance to determine the port to which the consumer electronic device is connected as described previously. Using the determined port capability information obtained from the appliance signature database, it would then be determined if the determined port to which the consumer electronic device is connected is a 4K capable port of the appliance, e.g., is one of HDMI port 1 or HDMI port 2. When it is determined that the port to which the appliance is connected is not a 4K capable port of the appliance, the voice enabled platform may then instruct the consumer, via use of an audio or visual instruction, to reconnect the consumer electronic device to one of HDMI port 1 or HDMI 2 port to thereby allow the consumer to fully utilize the capabilities of the consumer electronic device. As will be appreciated, as the system may recognize that HDMI port 1 or HDMI port 2 is already connected to another consumer electronic device, the system may function to recommend only an available port to the consumer. Furthermore, as the system may use the same process to determine that another consumer electronic device is coupled to an incompatible port, e.g., that a non-4K capable appliance is coupled to a 4K capable port, the system may further instruct the use to reconnect the another appliance to a different, more appropriate port of the consumer electronic device while instructing the consumer to use the now-free port to connect the consumer electronic device of interest.

As will be appreciated, the foregoing describes an example method in which a virtual voice assistant is used to optimize a utilization of a home entertainment system having at least a first device that causes a first data that identifies the first device, e.g., a device fingerprint, to be used to identify within a data store a one or more capabilities of the first device, e.g., port capabilities, that receives a voice input having one or more keywords that have been pre-associated within the data store to an operational problem associated with at least the first device, e.g., the picture on the TV is not working, that causes a state of at least the first device at a time at which the voice input is received to be identified, e.g., the second device is not plugged into the appropriate port on the TV, that causes the one or more keywords, the one or more capabilities of the first device, and the state of at least the first device to be used to identify within the data store a set of instructions for interacting with at least the first device to solve the operational problem, e.g., to instruct the consumer to reconnect the second device to the correct port of the first device, and that causes the set of instructions to be presented to a consumer.

In some instances where a consumer electronic device or appliance is not found in the consumer electronic device or appliance signature database, it will be appreciated that the system may use a machine learning process to attempt to predict a capability of the consumer electronic device via use of any consumer electronic device/appliance identifying data provide thereto for this purpose. In addition, it will also be appreciated that some capability information may be determined by analyzing data exchanges between appliances without the need to reference a particular database. For example, by analyzing EDID data, such as the data value provided for the amount of active or addressable horizontal pixels, it can be determined whether a port is 4K capable, e.g., a value below a threshold value—such as 1920—can indicate the port is not 4K capable.

Finally, in the event that is determined that no port of the appliance is capable of supporting the capabilities of a given consumer electronic device, the system can function to recommend additional appliances for purchase and/or integration into the system of the consumer as described in U.S. Pat. No. 9,600,082.

In further circumstances, the appliance detection operation may utilize a determined bandwidth (e.g., 18 Gbps or 48 Gbps and/or supported frame rate) to determine the attributes that would be needed by an appliance to provide the best consumer experience when the appliance is connected thru an HDMI cable. In this scenario, the database may be polled to obtain the recommended attribute information and the recommended attribute information can be used to automatically enable/disable certain features and/or settings, such as CEC, ARC, Internet over HDMI, framerate, etc., or to otherwise notify the consumer that manual enabling/disabling of certain features and/or settings would be desirable. Likewise, the database may be polled to obtain hardware recommendations, e.g., the consumer may be informed that using an ultra-high speed cable and connecting that cable to HDMI2 would provide the best consumer experience at 4k at 60 Hz and that the consumer should not use a determined current set up of 4k @30 Hz. Similarly, the system can recommend (for example when a video game console is detected) that the consumer setup the system to perform at 120 frames per second (fps) but at a lower resolution when gaming is made active (or cause such action to be performed automatically) while also using the obtained information to inform the consumer that using an ultra-high speed HDMI cable in this instance would not provide a better consumer experience.

It is also contemplated that, when an appliance does not support all of the latest HDMI features to provide the best consumer experience at the time that the appliance was set up, when/if the firmware of the appliance is updated, the steps described above can be repeated in order to provision the system in a manner that will provide the latest recommendations to the consumer to obtain the best consumer experience. In some circumstances, the steps can be caused to be repeated automatically in response to such a firmware update.

In a further example, the voice enable assistant may offer a consumer a choice between a product recommendation and a product compatibility check. In this context, a product recommendation comprises a review of the items in a consumer's current equipment configuration with the objective of generally suggesting improvements and/or additions to the consumer's current equipment configuration; while a compatibly check comprises a review of a particular consumer-specified product which is not currently part of an equipment configuration, with the objective of determining if this item is compatible with the existing equipment as currently configured. By interacting with the voice enable assistant, a consumer may be provided with an opportunity to further limit these reviews to only certain appliances or functionalities, for example audio or video appliances or functionalities.

Considering first the product recommendation mode, it will be appreciated that the steps comprising the review algorithm may be performed locally on the device 100, performed remotely at an associated server, or a combination thereof as appropriate for a particular embodiment. Similarly, it will be understood that data indicative of the current equipment configuration and data used for reference during the review process may be either locally resident on the device 100 or hosted by a server, in any convenient combination all as described above. In determining the adequacy of an existing configuration an exemplary review algorithm may, for instance when applied to the illustrative AV system configuration, consider capability factors such as:

Ability to support currently available (and/or future) formats, e.g., HDTV, Blu-ray DVD, DTS audio, 3DTV, etc.;

Ability to support currently available (and/or future) content delivery methods, e.g., on-line video and audio streaming services, IPTV, HD radio, etc.;

Ability to support currently available (and/or future) connectivity, e.g., HDMI, WiFi and/or Ethernet capability, USB and SD card interfaces, etc.;

Energy efficiency; and

Inconsistencies in the existing configuration, e.g., an HD DVR or Blu-ray player connected to an SD TV.

Once any inadequacies or inconsistencies have been identified, recommended improvements may be determined and presented to the consumer. In this regard, factors that may be considered in identifying suggested replacements or additions to the equipment configuration may include:

Features and capabilities necessary to rectify the identified inadequacies;

Support for nascent technologies (i.e., future proofing);

Cost of proposed units, which factor may be influenced by the price brackets represented by the existing items of equipment;

Dimensions;

Operational compatibility, e.g., support for CEC, EDID, RF4CE, etc.;

Reliability and/or consumer satisfaction ratings;

Purchase statistics derived from a consumer's peer group, i.e., other consumers with similar equipment configurations and/or demographics.

In some circumstances, consumer-specified filtering parameters may also be applied during this identification process, for example upper limits on price and/or dimensions, brand preference, etc. Input of such parameters may be solicited from a consumer at the start of the recommendation process or may be provided during initial installation and setup of the product recommendation app, as appropriate.

In addition, where a database of device command code sets is available for reference, for example where the product recommendation app is provided by or hosted by a manufacturer of universal controlling devices, the suitability of an appliance's command set may also be taken into account, for example:

Availability of so-called "discrete" power and input selection commands in support of activity macros (preferred to avoid toggled power confusion);

Preferred method of command transmission, e.g., if a majority of the other appliances in the existing configuration support non-line-of-sight command transmissions, such as for example the RF4CE protocol, preference may be given to replacement devices which are compatible with that command protocol;

Possible conflicts in command code format with appliances already present in the existing configuration; etc.

By way of further example and without limitation, a product recommendation method may first consider which product features are mandatory. These may include for example support for formats necessary for compatibility with other existing equipment in a consumer's configuration (e.g., HDTV compatibility), regional requirements (supply voltage, DVD region, PAL vs NTSC, etc.), consumer-supplied filtering parameters such as maximum price or dimensions, etc. Next, a product selection database may be scanned and those entries which satisfy the mandatory requirements selected as entries that are eligible for further examination. In this regard, an example product recommendation database may comprise a series of product records, each record in turn comprising a series of feature definition entries, each feature definition entry comprising a series of fields holding data indicative of a feature reference or type (e.g. HD capable, HDMI input, reliability rating, consumer survey rating, etc.), an indicator as to whether this feature is available on that particular product, any parameter associated with that feature (e.g., screen resolution, number of inputs, etc.), a rating value, e.g., between zero to ten, representative of the completeness or functionality of that particular feature as implemented within that product, or in the case of survey results, etc., a value representing a relative ranking within that appliance's peer group, etc For a feature which is absent, the rating value entry may be zero. As will be appreciated, data values corresponding to the fields of database may be distributed across multiple locations.

Once a set of qualifying products has been selected, a weighing factor may be assigned to each of the remaining non-mandatory features based on that feature's relative importance to the known equipment configuration in which it is to be used. In some embodiments, some or all of such weighing factors may also be consumer-adjustable according to personal preferences, e.g., cost. After weighing factors are established, a first product record from the set of eligible records is retrieved, and a product score may be accumulated, calculated in the illustrative example as the sum of the products of each participating feature's rating and the weighing factor established previously. Thereafter, the total score for that product may be saved and the process may be repeated until all eligible products have been scored. Upon completion of score calculations, the highest scoring product may be returned as a recommendation and the process is complete.

Once suggested replacement or add-on items have been thus identified, these may be presented to the consumer of the device 100, by audible and/or visual means. The consumer may be presented with an opportunity to be informed about additional information regarding the recommended appliances. For example, a selection of a displayed product identifier may cause a display of a summary of the features of the recommended appliance together with icons representing possible next actions by the consumer, for example: posting the recommendation to a consumer's social networking account for comment using icon, comparison of the recommended item to the appliance it is to replace in the current configuration (if any), obtaining purchase information, or returning to a prior display to review other recommended appliances (if any). Merchant information for use in the purchasing option may be obtained via use of known web-scraping technologies, may be provided by the merchants themselves (e.g., via an affiliates agreement), or the like.

Considering now the product compatibility or "shopping companion" mode, a consumer may wish to use the device 100 to verify the compatibility of a particular electronic appliance with their existing configuration, based upon for example an advertisement, a recommendation from a friend or a salesperson, a store display, etc. In such cases, a listing of the consumer's currently configured electronic appliances may be displayed and the consumer may be afforded an opportunity to remove from that configuration any device which is to be replaced by the new appliance under consideration. After completing any such input, a consumer may confirm the remaining equipment configuration and proceed to identify the type, brand, and model of appliance under consideration. Such identification may be by selection from a drop-down list, direct text entry with or without auto-complete, etc., as appropriate. In addition, the system may automatically identify the appliance under consideration from an uploaded photograph of the appliance under consideration, its packaging, or the like; from a captured product code associated with the appliance under consideration such as for example a UPC barcode, an RFID tag, or the like; etc. Yet further, the appliance may be an appliance that is being advertised to the consumer.

Once the identification information is provided a compatibility check algorithm may be performed. The factors considered in this process may be similar to those previously enumerated above. In addition, the compatibility check may incorporate further steps such as verifying that a sufficient number of suitable connections and input/output ports are available to allow optimal integration of the proposed appliance, etc. Once compatibility checking is complete, the result may be presented to the consumer. An example presentation may include a summary of the salient points considered in determining compatibility. Some embodiments may include an option for the display of additional information screens containing, for example, recommended interconnection schemes and methods, etc. In addition, options for posting to social media and locating a merchant may be offered as previously described.

By way of further example, when a new TV is provisioned in the system, the software agent may determine a set of recommended accessories such as a compatible wall bracket and speakers. The recommendations may be displayed by the app in a GUI on the device 100 or on a TV in communication with the device 100 where the consumer can select to purchase directly by selecting the corresponding link (image). The options provided to the consumer for purchase are preferably based on the other appliances in the home and by the cloud service determining from its local library which accessories are compatible with the new TV.

In a further example, the voice enabled systems may be utilized to offer interactive advertising. In one contemplated embodiment, a traditional tile on a home page of a Smart TV can be provided with a tile icon that represents the brand or product paying for the ad. When a consumer selects the ad, a virtual voice agent will interact with the consumer and the consumer some questions to find the best and most personalized product offering under the brand. In another contemplated embodiment, the virtual agent that includes functionality to provide technical support for common issues and queries related to AV and smart home devices can be further used to proactively offer up paid recommendations on products or services that can improve the smart home or AV system of the consumer. Still further, it is contemplated that the interactive advertising can be in the form of an interactive side-bar that is shown next to linear content ads that allows the consumer to learn more and ask questions about the product seen in the linear ad. Yet further, an implementation is contemplated that will monitor ongoing voice interactions by the consumer, and when consumer asks for something not natively offered by the TV (such as "order pizza", or "who has the best pizza"), the agent will offer up paid recommendations within context.

As will be appreciated, the foregoing describes an example method in which a virtual voice assistant is used to optimize a utilization of a home entertainment system having at least a first device that receives a first data that identifies the first device, that responds to a consumer interacting with an ad icon that represents a brand or product paying for the ad icon by causing the virtual voice assistant to interact with the consumer to obtain an information about a product of interest, that causes the first data and the information about the product of interest to be provided to a product recommendation application wherein the product recommendation application will use the first data and the information about the product of interest to identify within a data store one or more products having one or more features complimentary with one or more capabilities of the first device, and that causes the one or more recommended products to be presented to the consumer.

It will also be appreciated from the foregoing that the virtual agent need not be integrated "on device," for example on a headless device like a Far Field Voice Assistant, a Smart Speaker or on devices with a screen or connected to a screen for example a TV, Set Top Box, Smart Display, Mobile Phone, Tablet or Laptop. Rather, the virtual agent can be integrated into a mobile application or into a communication platform like the "Facebook Messenger," "WhatsApp," "Telegram," "Skype," or the like type of branded apps. Still further, the virtual agent can be integrated on a support website either in the form of an embedded web based chatbot or as a pure server driven graphical consumer interface that communicates with the consumer through cards that adapt to the consumer interface, screen size, and modality of the device. These cards (which are called one from another by the virtual agent AI based on a context and/or interactions with the consumer) provide the necessary information to the consumer to present instructions including pictures and other graphical elements that help the consumer, present information, or can be used to extract information from the consumer by providing input fields, by capturing consumer voice utterances, by using the built in camera on the consumer interface device to take a picture, scan a QR code, take a video or stream live video to the virtual agent. Thus, it will be appreciated that the virtual agent can be adapted to interact with the consumer through a multitude of multimodal interfaces, such as by speaking, typing, tapping, and/or swiping, as needed for any particular purpose.

It will also be appreciated that the virtual agent can communicate directly with the consumer or it can sit behind an existing third-party assistant, such as a virtual voice assistant, where the virtual agent is activated when the third-party assistant receives a domain specific question or utterance from the consumer. The consumer will still communicate with the third-party assistant in this example but the conversation will be powered by the technical support virtual agent that has been linked to by the third-party assistant until the issue has been resolved whereupon the third-party assistant will again take over the conversation with the consumer.

In an example, the virtual agent is embedded within or otherwise accessed by the controlling device configuration application. In this manner, the controlling device configuration application, in connection with the virtual agent as needed, will automate the out of the box device and/or service setup experience for the consumer using the virtual agent to walk the consumer, e.g., via use of appropriately selected card, through any steps for which consumer assistance is determined to be needed. As discussed previously, this configuration process can be automatically invoked in response to the system determining a change within the system, such as the sensed addition of a new device, app, and/or service within the ecosystem.

To provide the best technical assistance to the consumer, the virtual agent must provide the most appropriate questions, answers, and solutions to the consumer. For this purpose, to the extent the virtual agent cannot automatically obtain any needed information from the system (for example as obtained by a complementary app, such as a controlling device app that would try to automatically obtain information such as a device brand, type, model number, current state, etc.), the virtual agent will be required to ask the consumer for this information. In some instances, a virtual agent may need to assist the customer in providing any needed information. For example, as a consumer does not always know the exact name or brand of a device, the virtual agent can be adapted to assist the consumer in selecting a device, device type, and/or device model by use of cards which includes pictures or icons to help the consumer select the right device.

Once gathered, the information will preferably be stored in a knowledge base in association with an identifier to thereby establish an ownership mapping between the consumer and/or the consumer's smart home and the appliances/services that will be included in the consumer's "connected" environment. By storing the information in this manner, when future technical support services are to be provided by the virtual agent the system may then only query the consumer as needed, e.g., to ensure that a given appliance/service is still installed within the environment (to the extent the system is not able to automatically verify this information), to inquire if some additional, undetectable change has been to the environment, etc. Storing the information in this manner will also ensure that the consumer will get answers that are most likely to be relevant to the device(s)/service(s) that the consumer is most likely to be experiencing issues with.

Figure 8:
FIG. 8 illustrates a screenshot of an example user interface for providing a support service in which context is used to auto-populate a portion of the interface.
Figure 9:
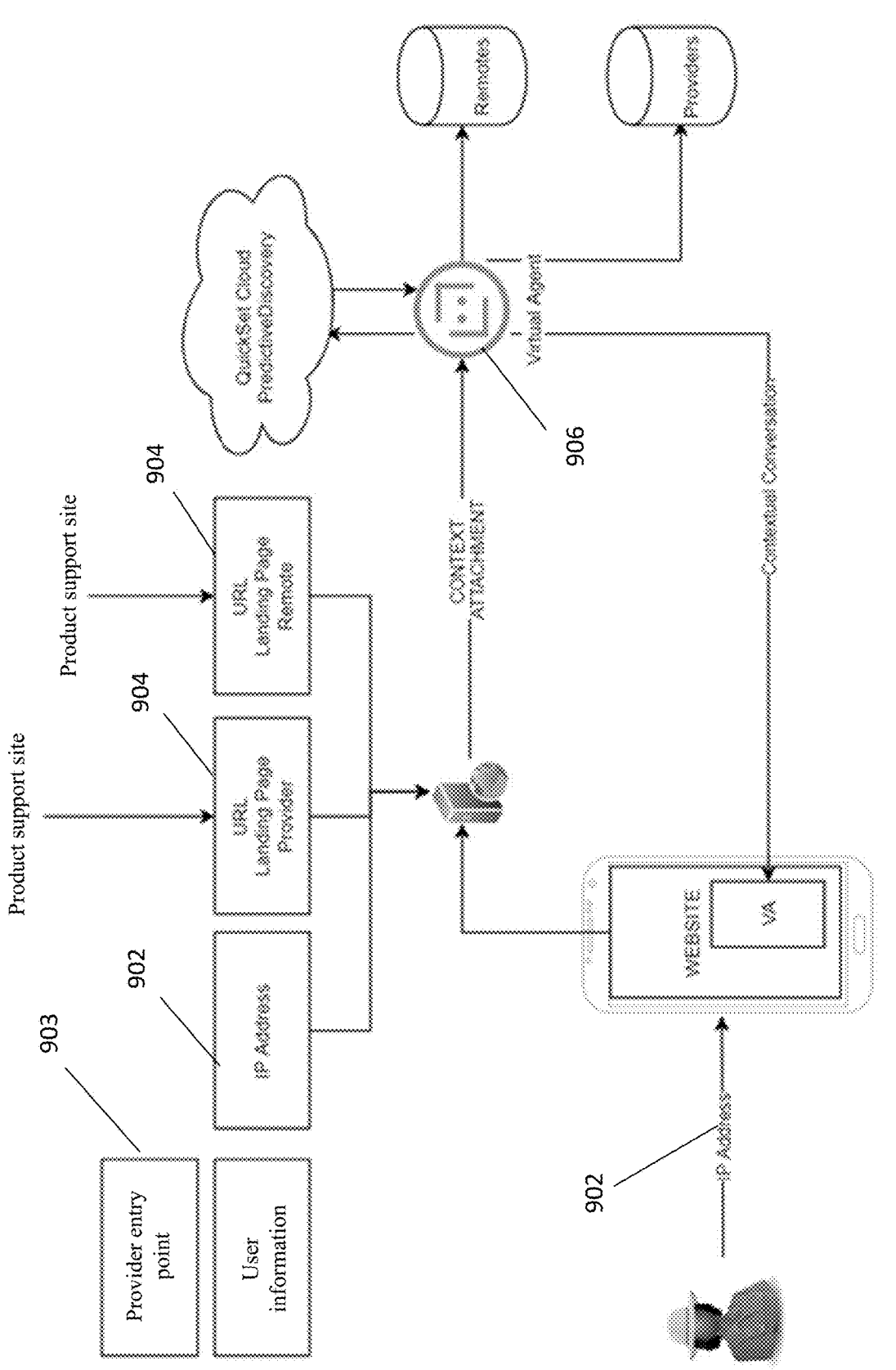
FIG. 9 illustrates an example ecosystem by which context information is capable of being captured.

More particularly, the environment related information, whether actively collected and/or stored by the virtual agent as per the above or by other application(s) capable of sharing information with the virtual agent, will be used to provide a context to any interactions with the virtual agent. For example and as shown in FIG. 9, the context for a consumer's "connected" environment may include, as needed for any given purpose, a geo-location (e.g., a home address), a preferred language(s), the ISP(s) (Internet Service Provider) 902 being used by the home or otherwise associated with the consumer, the TV/streaming media service provider(s), entry point of a virtual agent session (e.g., device, website, and/or voice assistant service) 903, a specific section on a support site if accessed (e.g., a URL that specifies a device and/or service brand and/or model as appropriate) 904, etc. In this manner, the context will allow the virtual agent 906 to more quickly identify the questions and answers that the consumer will need, e.g., as a "Cox" brand ISP subscriber who is using the virtual agent from the "Cox" brand website, the virtual agent (for example by being embedded in, hosted by, or otherwise linked to the Cox assistant) should not have to make the consumer select a provider because, given this context, the virtual agent should understand that the consumer is a subscriber of the "Cox" brand ISP. In addition, knowing that the consumer is a "Cox" brand subscriber and knowing the equipment provided by Cox, the system can use the content to take the consumer immediately to a remote control selection screen 800 as shown in FIG. 8 when assisting the consumer in a remote control setup operation rather than require the consumer to perform multiple question and answer steps to arrive at this same point in the process. It will also be appreciated that any user interface that relies upon contextually derived information should include a mechanism, such as an input element 802, by which the consumer can initiate a correction of any information as needed.

In a preferred example to, for example, prevent a negative experience for the consumer, the context also includes an indication of customer sentiment and/or the customer perceived severity of the issue. To this end, the virtual agent can, through use of voice processing and/or image processing, deduce the sentiment of the customer by considering, among other things, the tone, speed, and/or words used by the customer, the facial expressions of the user, and the like while interacting with the virtual agent. The perceived sentiment can then be used to select amongst plural different dialog flows and/or actions (e.g., as supported by cards utilized by the AI of the virtual agent) or even lead to immediate hand-offs to a human. Similarly, in order to detect the severity of the issue or an utterance, the virtual agent will detect certain key phrases from a conversation and scale an issue or utterance into a specific category, such as low, high, or critical. As before, the determined level of criticality to a consumer could be used to select a corresponding response from the virtual agent, e.g., to cause a dispatch to a different skill or potentially a hand-off to a human agent or third-party contact details. The virtual agent will also be adapted to perform a hand-off operation when the virtual agent is unable to understand the customer, does not have a skill appropriate for a determined issue, and/or it becomes apparent, given the conversation, that the customer desires a hand-off, particularly to a human agent. Thus, such hand-off triggers may include, as needed for any particular purpose, a predetermined number of missed interpretations by the virtual agent (signaled, for example, by the same question being asked in repetition), utterance of a phrase indicative of the consumer wanting to talk to a human, the consumer asking for a phone number, or the like. In the case where the virtual agent cannot directly link the consumer to a third-party, the virtual agent should provide the consumer with one or more of a phone number, a live chat URL, a support website URL, and a support community URL.

As noted above, the virtual agent will have the ability to extract context from different sources, including repositories and/or from devices in near-real time as required. The content information, such as geo-IP location of the home, current location on a website, devices owned by the consumer, current device being used by consumer (in the inquiry), geo-IP location of the consumer, ISP of the consumer, etc., may be used to, among other things, identify and match a specific device brand or device model number to a support request from the consumer. For example, because the virtual agent already knows information about the eco-system of the consumer at a given location, collected by means of a previous interaction(s) with the virtual agent and/or app(s)/service(s) with which the virtual agent is adapted to communicate, when the consumer has an issue with his smart lights in his home and initiates a support session with the virtual agent, the virtual agent can speed up the process by using the context to skip asking the consumer which brand and model number of the smart lights are available in the consumers network, etc. In addition, because the virtual agent will also know that the consumer has 6 smart lights and that 2 of the smart lights were last seen online 4 days ago and, as such, it is likely that something might be wrong with either the power supply or the network between the smart light and the gateway, the virtual agent can immediately direct questioning towards resolving this potential issue.

In one example, the virtual agent collects such information by providing a configuration service and/or by cooperating with a configuration application, such as one of the above-described controlling device configuration applications. By assisting the consumer with the steps needed to configure a controlling device, network, service, or the like, e.g., when assisting a user in device authentication and/or pairing operations, the virtual agent will be able to identify the devices, services, and system configurations of the smart home of the consumer. Such devices (and services associated with such devices) might include IoT devices such as smart lights, smart plugs, smart switches, smart thermostats, smart blinks, smart locks, smart doorbells, security cameras, etc., consumer electronic devices such as AV devices, game consoles, televisions, set-top boxes, media streamers, etc. networking devices such as routers, wireless access points, etc., and the like. In addition, the context may be used to assist the consumer in configuring and/or integrating legacy or non-connected devices into the ecosystem, for example to setup a simple, universal infrared remote control to control one or more of the known consumer electronic device in the smart home of the consumer, to configure a device to access a home network, or the like. In these examples, it will be appreciated that contextual information, such as the name of the ISP, the brand/model of a device, etc., may be used to pre-fill parameters in the templates/cards used by the AI of the virtual agent to perform the various functions described herein.

In operation the system will support analytics for the virtual agent to measure engagement rates for the virtual agent, segment conversations according to intents, identify bottlenecks in conversations, observe conversations, understand all data generated by conversations, find and cure not-handles intents, and discover improvement areas in the flows. By way of example only, Tables 1 and 2 below lists metric topics of a virtual agent that could be tracked, visualized, and used as desired to train machine learning processes that support the virtual agent.

TABLE 1

| Conversational Analytics | |
| --- | --- |
| Requirement | Consumer Story |
| 1 Not Handled Intents | Present a List of Not Handles Messages/Utterances Used to track what utterances are not understood by the virtual agent. This can identify where the NLP is breaking and quickly update LUIS, QnA KB or Skill to improve response effectiveness and consumer experience. |
| 2 Success Rate per conversation | Used to track, for each conversation, if the consumer has found a successful solution or not. This should be visualized by a simple metric: For example: Average 60% successful solutions vs 40% unsuccessful |
| 3 Intent Mapping | Used to learn what wording people use for specific intent we should be able to see how utterances are mapped to intents and see a list of utterances per intent including the quantity per utterance. |
| 4 Conversation Transcripts | Used to provide full conversation transcripts for analysis. Can be used to determine the conversation path, drop off moments, and the like. |
| 5 Categorize & List Unsuccessful Conversations | Used to filter unsuccessful conversations. Can be used to find the bottlenecks, issues, or generally why conversations were not successful |
| 6 Categorize questions | Used to categorize questions |
| 7 Cluster similar phrases | Used to cluster similar phrases for not handled intents |

TABLE 2

| | Requirement | Consumer Story |
|---|---|---|
| | | Consumer Behavior Analytics |
| 1 | Consumer Rating | Used to collect rating data, e.g., people give a rating (1-5 Stars) after each session/conversation with the ability to provide open feedback. |
| 2 | Top Intents | Used to provide a list with top intents extracted from the consumers. |
| 3 | Most Asked Questions | Used to provide a list of most asked question from the consumers. |
| 4 | Drop Off | Used to track the moment where a consumer drops of the virtual agent session |
| 5 | Fall Back | Used to track how many consumers falls back to a traditional support site and to track when in the conversation the do fallback. |
| 6 | Popular Path | Used to visualize the popular path that people take. |
| 7 | Sentiment Rating | Used to capture sentiment for each conversation. |

As noted above, the collected analytics data can be visualized as desired. By way of example only, Table 3 provides an example of information that can be visualized. As will be appreciated, such information may be displayed and manipulated as desired by a user, for example, by a user interacting with a correspondingly provided graphical user interface element of a dashboard or the like.

TABLE 3

| | Requirement | Consumer Story |
|---|---|---|
| | | Analytics Dashboard Features |
| 1 | Preset Timeframe | Used to filter the statistics based upon a preset timeframe such as today, last 24 hours, last 7 Days, Last 30 Days |
| 2 | Custom Timeframe | Used to specify a custom time frame and see statistics of that period. |
| 3 | Average Conversation Steps | Used to show the average conversation steps per consumer |
| 4 | Average Sessions Length | Used to show the average sessions length in minutes |
| 5 | Active Consumers | Used to show the total active consumers on the platform |
| 6 | New Consumers | Used to show the total amount of new consumers |
| 7 | Returning Consumers | Used to show the total amount of returning consumers |
| 8 | Total Messages | Used to show the total amount of messages |
| 9 | Total Messages Sent | Used to show the total amount of messages sent by the virtual agent |
| 10 | Total Received Messages | Used to show the total amount of received messages |
| 11 | Total Conversations | Used to show the total amount of consumer conversations |
| 12 | Most Active Hours | Used to show the most Active Hours for the Virtual Agent |

As will be further appreciated by those of skill in the art, the above is not meant to be limiting and additional types of metrics can be collected, analyzed, and visualized as desired. Thus, by way of further example, the system may be used to capture and analyze engagement and retention data such as daily, weekly, and monthly cohort retention, sessions per consumer, time per session, messages/interactions per session, active, engaged, and returning consumers, lifetime consumers, etc., customer behavior data such as top messages, utterances, interactions, and intents, top exit messages, message, utterance, interaction, and intent funnels, goal funnels, escalations/containment, goal conversions, conversation paths, behavioral flows, etc., demographic data such as top consumers, locations/locales, genders, languages, time zones, access device capabilities like audio only, display only, and display and audio, etc.

As also discussed above, to assist the consumer in instances where the virtual agent may be incapable of assisting the consumer alone, the system may perform a hand-off and, include with the hand-off, any context information that the system may deem necessary to provide the consumer with the best experience. Accordingly, to safeguard consumers from a scenario where the virtual agent causes a bad experience, the system is adapted to know when to handover a conversation to a human. The virtual agent must be smart enough to know the end of its capabilities and suggest the human alternative. For example, when a query of the consumer is too complex or out of scope, the conversation could be handed over to a human agent, after 3 missed intents in a row, the virtual agent could offer the consumer the option to talk to a real person whereupon the system can try to automatically connect the consumer with the human agent or provide the contact information to the consumer, etc.

A human hand-off can also be initiated if the consumer explicitly asks to speak to a human. When the virtual agent detects this intent, the virtual agent should ask the consumer if he/she would like to talk to a human as a confirmation. Similarly, a human hand-off could be initiated from a consumer-driven menu. These options would be less desirable, however, because consumers will tend to request a human more often and there will be times when the consumer would want to chat with a human agent for queries that could have been handled by the virtual agent. As will be appreciated, this defeats the basic purpose of having a virtual agent, i.e., to free up a human's time for complex queries.

In another example, a hand-off can be based on consumer sentiment, For example, an AI service, such as included with Microsoft's "Azure" branded NLP product, can be used with the virtual agent to make the virtual agent smart enough to infer the mood of the consumer. By using such a service, the virtual agent will be able to determine whether the conversation is going in the right way. Thus, whenever the virtual agent senses that the consumer is edging on frustration, the virtual agent can simply slip in "Chat with human" as an option. The end-consumer can than select the option if he/she believes the virtual agent to be incapable of solving his/her problem. As will be appreciated, images captured by a camera can likewise be analyzed to determine facial expressions for this same purpose.

In a further example, issue severity can be used to determine if a hand-off is appropriate. In this regard, it will be appreciated that not all support issues are of the same importance to a consumer and they should be handled accordingly. To support such functionality, the virtual agent can be trained to understand the severity of the situation based on specific keywords/phrases being found in the conversation.

Another capability would be to use keywords to detect psychological problems which could potentially harm people. In this case, the virtual agent could offer the ability to provide a (warm) hand-off to an expert that would be otherwise unrelated to the technical support services being offered.

As will be appreciated from the foregoing, a primary goal of the virtual agent is to use machine learning models to determine the likely cause of a technical issue and to suggest the best possible resolution. To help train the learning models, a human agent can be used during the training process to cross-check some or all determinations made by the virtual agent before actually suggesting a solution to the consumer. Similarly, an internal monitoring system can be provided with the virtual agent whereby the virtual agent can seek guidance and authorization from a human agent whenever the confidence level of a determination is low. In such a case, the agent simply needs to review the proposed solution and give a go-ahead by clicking a button, i.e., the virtual agent is still doing most of the task work, but the final authority remains with the human agent.

Preferably, in the instances discussed above, it is important for the consumer's overall experience that the technical support service hand-off is seamless. To this end, the hand-off process can be considered as having 3 phases, the pre-hand-off phase, the wait phase, and the post hand-off phase.

The pre-hand-off phase is the phase in which one of the above scenarios has occurred and the virtual agent needs to transition control to the human agent. This phase involves two elements, the detection of a hand-off trigger and the acknowledgement (and confirmation as needed) of the trigger being detected. In this regard, it is important to let the consumer know about the transition while it is happening. This will set the expectation that while the hand-off is in progress the ticket is unassigned and questions sent during that time could only be answered when an agent is assigned. The virtual agent should be able to provide the queue position and wait time during hand-off if this is provided by the support center.

The wait phase is the intermediary phase where the support ticket is put in a queue. During this phase, it is very important to manage consumer expectations, as there might be waiting times. In an example, the virtual agent could display and/or audibilize the consumer's position in the queue and answer all incoming questions with a default response like "waiting in queue". During the wait phase, it may also be desirable to provide the consumer with an option to confirm if they would like to "wait" or file an email issue instead, particularly when the wait time takes longer than expected. Similarly, the system may allow the consumer to schedule a call back appointment if supported by the support center.

During the wait phase, the human agent is also assigned to assist the consumer. To this end, the system may simply implement a First In First Out (Round Robin) model. This is a rather simple model where the first ticket in the queue is assigned to the next available human agent and tickets are assigned in the order in which they are filed. The system may also implement a contextual assignment model. This kind of assignment uses more logic and assigns human agents based on contextual factors. The factors can be anything, for example the geography or the language of the consumer or any other information available through a companion application or service, such as the controlling device configuration application.

In the final post hand-off phase, the assigned human agent takes over the conversation. This phase should not be neglected or overlooked while designing the hand-off flow as it is crucial for enhancing the virtual agent over time. For example, a conversation transcript should be made available to the human agent. In this regard, it is important to understand that while the human agent has just joined the conversation, the consumer has been there for long and has shared a lot of information already. The consumer, therefore, should not be forced to go through the same process again and answer repetitive questions. The conversation can be shared with the human agent in the form of text messages in the agent's chat window, be sent as an attachment, or through other integrations as desired.

It is also desired that the post hand-off phase have a feedback loop aspect. The feedback loop can be used to identify any scope of improvement, e.g., to train the system, to bring human involvement to a bare minimum. For this purpose, the system may trace-back to the point where the consumer was directed to a human agent to teach the system the solution to the problem. By use of the feedback loop, the system may learn of questions that the virtual agent is not currently able to answer or for which the virtual agent provides an answer which is confusing for the consumer. Another likely training point can be the how the human agent resolved the issue when the virtual agent had to go through too many conversations. As will be appreciated, the above-mentioned features would be assisted use of the previously described virtual agent analytics.

While various concepts have been described in detail, it will be appreciated by those skilled in the art that various modifications and alternatives to those concepts could be developed in light of the overall teachings of the disclosure. Further, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All patents and patent applications cited within this document are hereby incorporated by reference in their entirety.

What is claimed is:

1. A method for providing consumer electronic device related technical support to a consumer, comprising:

in response to a consumer electronic device being automatically determined to have been newly added to an ecosystem automatically starting a session with a virtual agent where the virtual agent performs further steps comprising: determining a contextual information for the ecosystem that includes the consumer electronic device; using the determined contextual information to select from a plurality of cards usable by the virtual agent to cause one or more different types of physical devices to interact with consumers for the purpose of providing consumer electronic device technical support related to each of a plurality of different consumer electronic devices a one of the plurality of cards; using the selected one of the plurality of cards to cause a physical device known to be in communication with the consumer based on the determined contextual information to interact with the consumer whereby further ones of the plurality of cards can be used to cause the physical device to collect from the consumer a further contextual information determined to be needed to provide the technical support related to the consumer electronic device desired by the consumer; and continuing to use further cards selected from the plurality of cards to collect from the consumer via the physical device the further contextual information until it is determined that the virtual agent has provided the last possible technical support related to the consumer electronic device given the further contextual information collected, an end of the technical support session has been indicated by the consumer, or a hand-off of the consumer to a further agent is needed.

2. The method as recited in claim 1, comprising using an entry point from which the virtual agent was accessed to automatically determine the contextual information for the ecosystem.

3. The method as recited in claim 1, wherein the physical device hosts the virtual agent and the method comprises using a device identifier for the physical device to automatically determine the contextual information for the ecosystem.

4. The method as recited in claim 1, wherein the contextual information comprises a service provider identifier for a service associated with the consumer electronic device.

5. The method as recited in claim 4, wherein the service comprises an internet service provider service.

6. The method as recited in claim 4, wherein the service comprises a media provider service.

7. The method as recited in claim 6, wherein the media provider service comprises a media streaming provider service.

8. The method as recited in claim 1, wherein the contextual information comprises a brand and model for the consumer electronic device.

9. The method as recited in claim 1, further comprising using the contextual information to pre-populate one or more data fields within one or more cards.

10. The method as recited in claim 1, wherein the physical device comprises a stand-alone virtual voice assistant.

11. The method as recited in claim 1, wherein the physical device comprises a further consumer electronic device having an associated display device.

12. The method as recited in claim 1, further comprising determining an issue severity level associated with interactions with the virtual agent by the consumer and using the determined issue severity level to determine if the hand-off is needed.

13. The method as recited in claim 1, further comprising determining a mood associated with interactions with the virtual agent by the consumer and using the determined mood to determine if the hand-off is needed.

14. The method as recited in claim 13, further comprising using voice utterances by the consumer to determine the mood associated with interactions with the virtual agent by the consumer.

15. The method as recited in claim 14, further comprising using image data of the consumer to determine the mood associated with interactions with the virtual agent by the consumer.

16. The method as recited in claim 1, wherein the technical support is related to on-boarding of the consumer electronic device.

17. The method as recited in claim 1, wherein the technical support is related to installing a service on the consumer electronic device.

18. The method as recited in claim 1, wherein the technical support is related to enabling a feature of the consumer electronic device.

19. The method as recited in claim 1, wherein the virtual agent is adapted to interact with the consumer through use of a voice interface of the physical device.

20. The method as recited in claim 1, wherein the virtual agent is adapted to interact with the consumer through use of a touch screen display interface of the physical device.

21. The method as recited in claim 1, wherein the contextual information comprises a geo-location of the consumer electronic device.

22. The method as recited in claim 21, wherein the physical device known to be in communication with the consumer comprises the consumer electronic device.

23. The method as recited in claim 1, wherein the contextual information comprises a geo-location of the consumer electronic device.

24. The method as recited in claim 1, wherein the contextual information comprises a one or more service providers associated with the consumer electronic device.

25. The method as recited in claim 1, wherein the physical device known to be in communication with the consumer comprises a mobile device registered to the consumer.

26. The method as recited in claim 1, wherein a configuration application installed on a controlling device automatically determines that the consumer electronic device has been newly added to the ecosystem and the configuration application automatically starts the session with the virtual agent.

* * * * *